United States Patent [19]

Nielsen

[11] Patent Number: 4,502,533
[45] Date of Patent: Mar. 5, 1985

[54] TUBULAR PIPE PART FOR COAXIAL HEAT EXCHANGE

[75] Inventor: Uffe D. Nielsen, Hexolm, Denmark

[73] Assignee: Wavin B.V., Netherlands

[21] Appl. No.: 345,681

[22] Filed: Feb. 4, 1982

[30] Foreign Application Priority Data

Feb. 6, 1981 [NL] Netherlands .................... 8100588
Feb. 6, 1981 [NL] Netherlands .................... 8100589

[51] Int. Cl.³ .............................................. F28D 7/10
[52] U.S. Cl. .................................................. 165/154
[58] Field of Search ................... 165/173, 154, 155, 29

[56] References Cited

U.S. PATENT DOCUMENTS

| | | | |
|---|---|---|---|
| 3,435,633 | 4/1969 | Dixon | 165/154 |
| 4,150,720 | 4/1979 | Brackman | 165/174 |
| 4,194,560 | 3/1980 | Matsuzaki | 165/155 |
| 4,265,225 | 5/1981 | Berger et al. | 165/173 |
| 4,308,042 | 12/1981 | Ecker | 165/29 |
| 4,416,257 | 11/1983 | Bale | 165/175 |

FOREIGN PATENT DOCUMENTS

| | | | |
|---|---|---|---|
| 778461 | 3/1935 | France | 165/155 |
| 889950 | 1/1944 | France | 165/154 |
| 1070119 | 7/1954 | France | 165/154 |
| 549428 | 7/1956 | Italy | 165/141 |

*Primary Examiner*—Sheldon J. Richter
*Attorney, Agent, or Firm*—Wigman & Cohen

[57] ABSTRACT

A plastic tubular heat exchanging element consists of a tube or tubular element comprising an inner wall and an outer wall interconnected by partitions, thereby forming longitudinal channels.

The channels are connected with a fluid supply chamber and a fluid outlet chamber for feeding and removing a heating fluid. Preferably a supply chamber and outlet chamber are formed by a tubular sleeve, sealingly engaging a wall of the heat exchanging element by applying sealing rings.

The supply chamber and outlet chamber may be located near the ends of the tubular heat exchanging element. The chambers may also be opposite each other while the other end of the tubular element is closed by a covering cap forming a chamber for passage of heat absorbing fluid from the supply chamber toward the outlet chamber, located at the same end.

9 Claims, 8 Drawing Figures

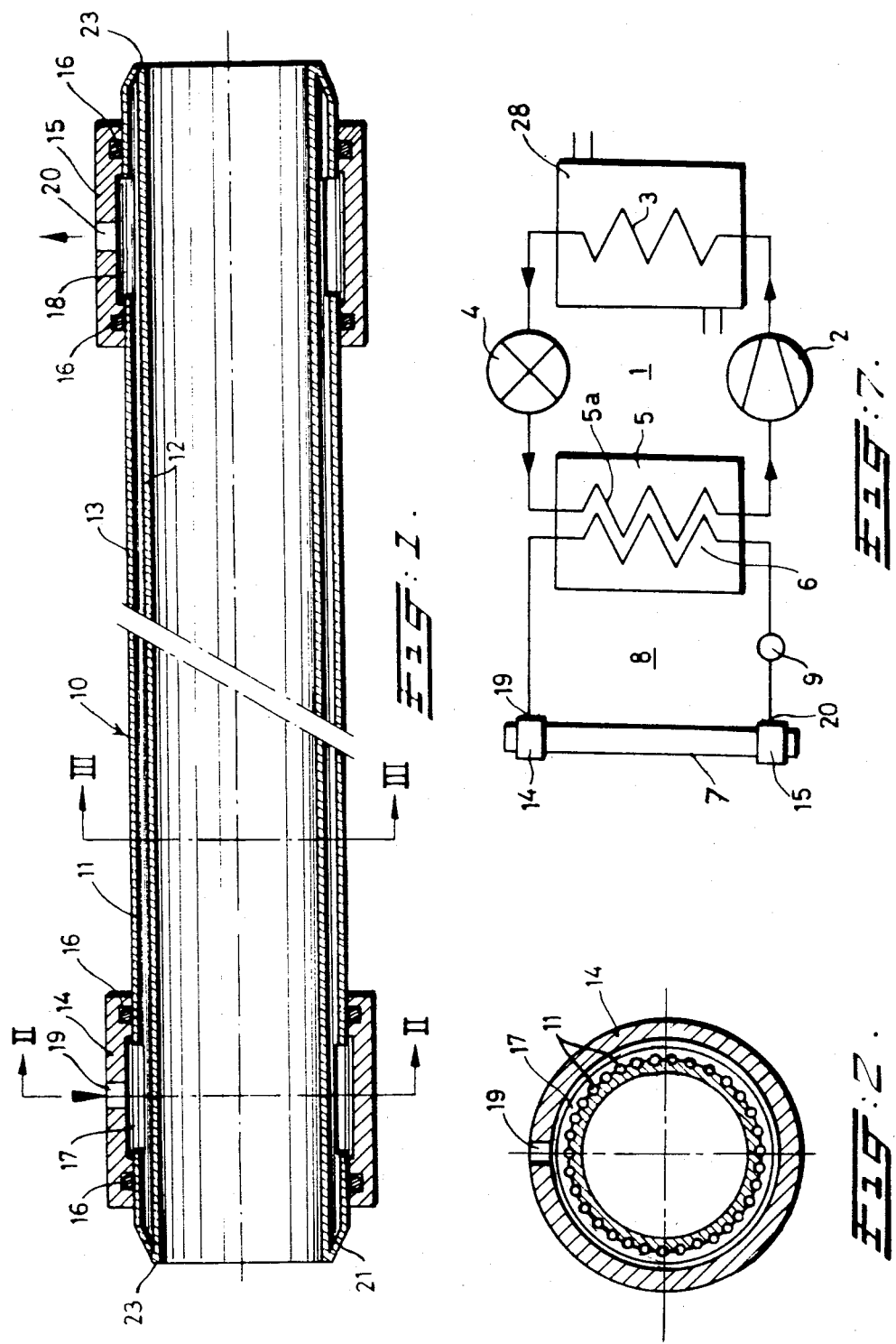

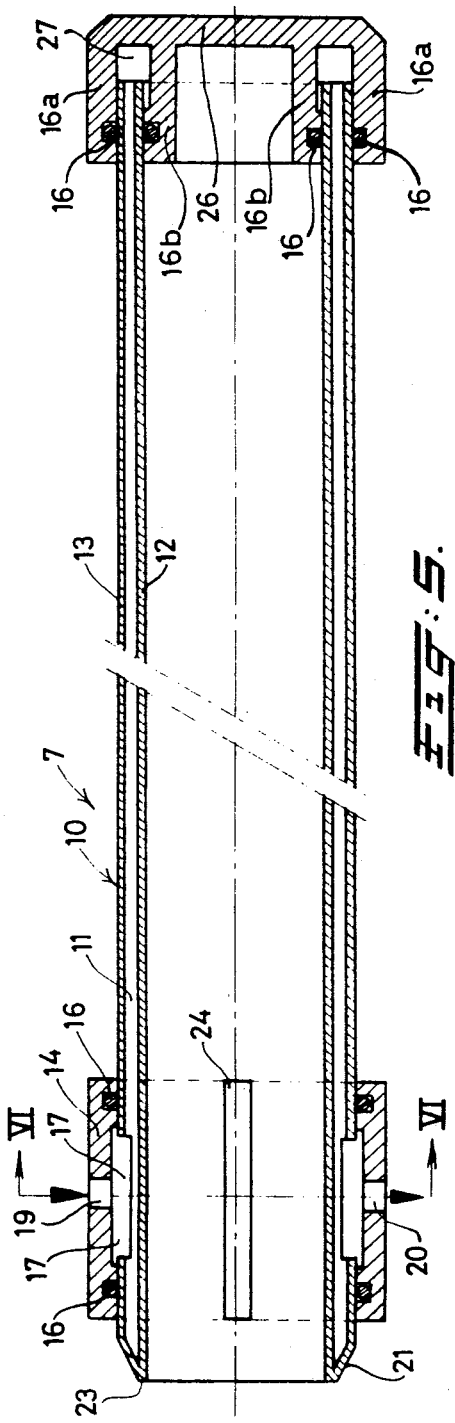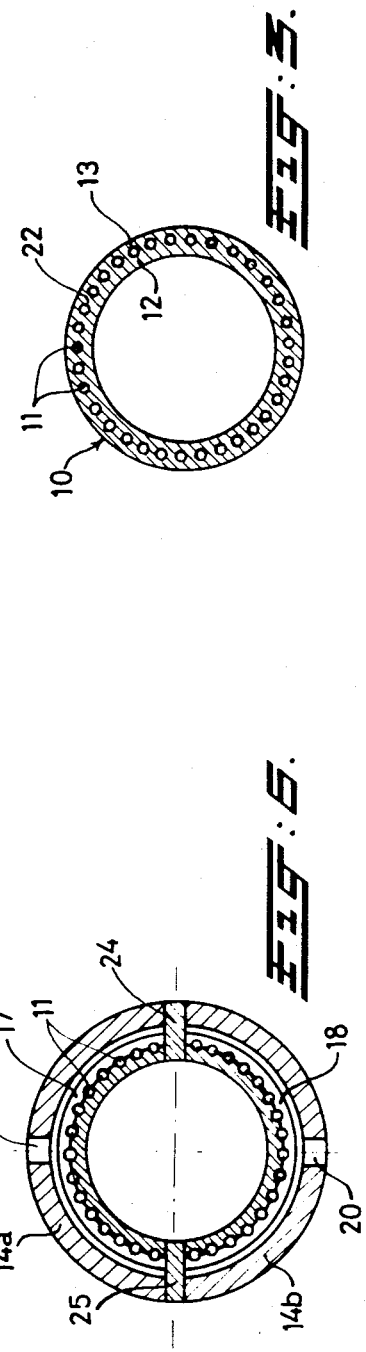
Fig. 5.
Fig. 6.

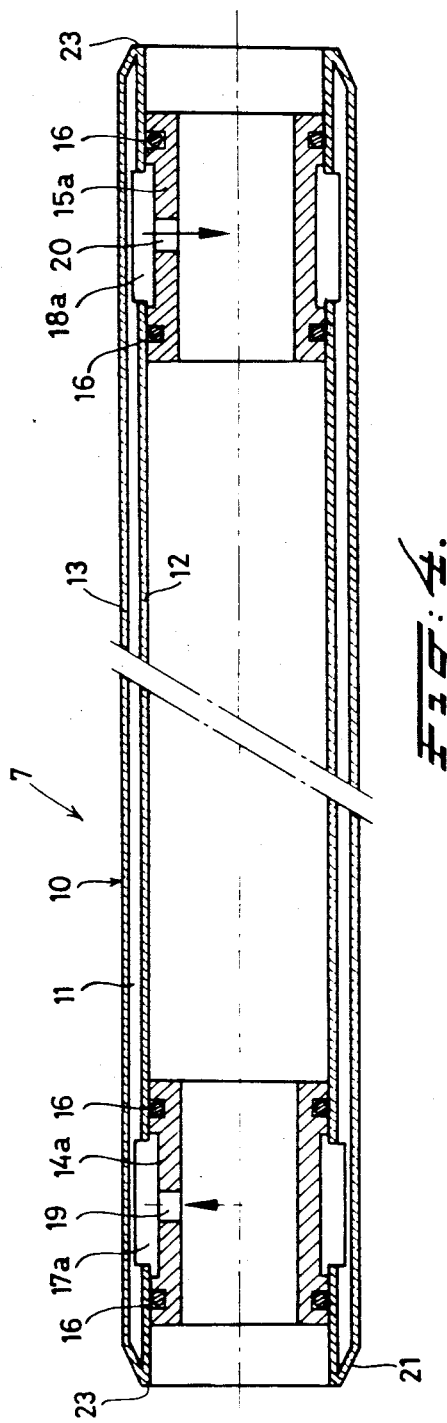

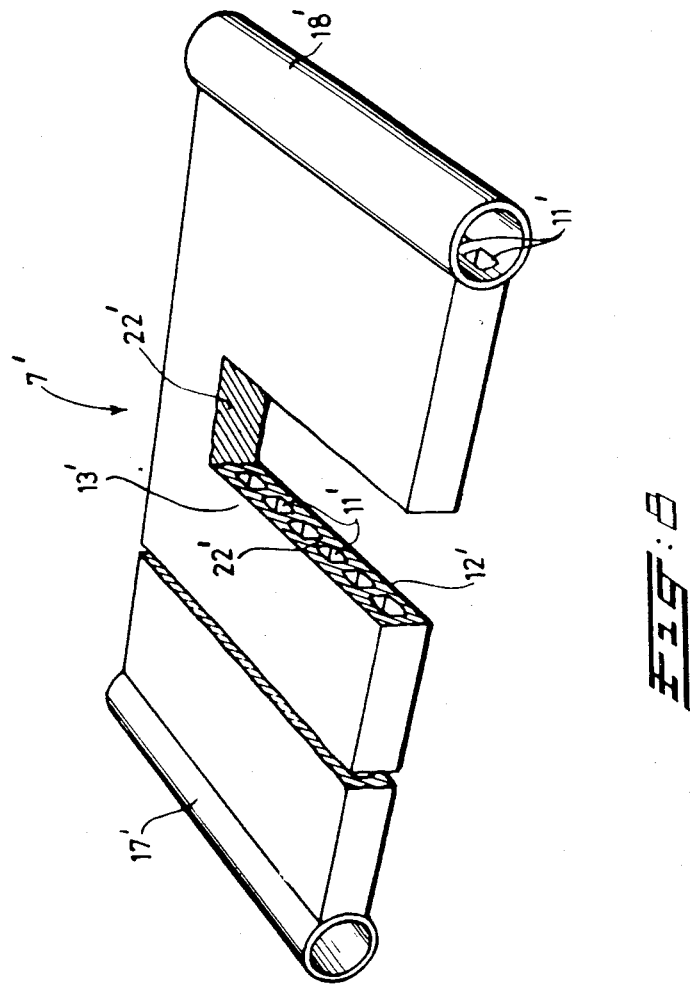

TUBULAR PIPE PART FOR COAXIAL HEAT EXCHANGE

BACKGROUND OF THE INVENTION

1. Field of the Invention

The present invention relates to a heat exchanging element comprising a plurality of tubular passages disposed adjacent each other for conveying a heat exchanging fluid, as well as a fluid supply chamber and a fluid outlet chamber connected to said passages.

2. Description of the Prior Art

A heat exchanging element of this type in the form of a panel, comprising a plurality of adjacent tubular passages which tubular passages are connected to a tubular supply channel and a tubular outlet channel, is known in the art.

Such a known heat exchanging element has the drawback that the provision of connections between the tubular passages in the form of channels connected to a fluid supply channel, fluid outlet channel respectively, is cumbersome and time-consuming, as each tubular passage or channel has to be sealingly connected with the fluid supply, fluid discharge channel respectively.

An additional drawback of such a known heat exchanging element is that the ratio between the heat exchanging surface of the heat exchanging element and the surface occupied thereby, is in some cases very inconvenient, especially in case that heat exchanging elements are used for the absorption of energy from solar radiation.

SUMMARY OF THE INVENTION

It is a primary object of the present invention to provide a heat exchanging element in which the connections between the tubular passages and a fluid supply channel, fluid discharge channel respectively, can be easily effected while on the other hand an optimum ratio can be obtained between the heat exchanging surface of the heat exchanging element and the surface occupied by the heat exchanging element in comparison with flat heat exchanging elements.

This object is attained according to the invention in that the heat exchanging element is a tubular element comprising an inner wall and an outer wall, and partitions accommodated thereinbetween, thereby forming longitudinally extending channels as tubular passages.

The use of a tubular element of such a type provides an optimum ratio between the heat exchanging surface of the heat exchanging element in comparison with the occupied surface. Additionally the tubular passages can be easily connected with a fluid supply channel, fluid discharge channel, respectively.

Very advantageously all passages open into a supply chamber and an outlet chamber which supply chamber and outlet chamber are each accomodated near one end of the tubular element, the front sides of such a tubular element being closed.

In a very favorable embodiment the supply chamber or the outlet chamber are formed by an outer pipe part, provided with an inlet or outlet, which outer pipe part sealingly engages an outer wall of a tubular element, whereby in the area of a supply chamber, outlet chamber respectively, the wall parts between the channels and the supply and outlet chamber have been removed.

In another very favorable embodiment one end of the tubular element is provided with an open connection between the passages and the outlet chamber, inlet chamber respectively, which are positioned opposite each other, whereby a part of the passages opens into the supply chamber and another part into the outlet chamber.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a cross-section through a heat exchanging element according to the present invention;

FIG. 2 is a cross-section according to line II—II;

FIG. 3 is a cross section according to line III—III;

FIG. 4 is a modified embodiment of a heat exchanging element according to the invention;

FIG. 5 is an additional modified embodiment of a heat exchanging element according to the invention;

FIG. 6 is a section according to line VI—VI;

FIG. 7 is a schematic view of a heat providing system according to the invention and FIG. 8 is a section through a suitable heat absorbing element for use in the system of FIG. 7.

DESCRIPTION OF THE PREFERRED EMBODIMENTS

Referring now to FIGS. 1 to 3 incl. a tubular heat exchanging element 7, comprises an inner wall 12 and an outer wall 13 whereinbetween partitions 22 are provided forming longitudinally extending channels 11 as tubular passages. The partitions 22 are advantageously integral with the inner wall 12 and the outer wall 13, so that a high degree of rigidity of the tubular element 10 is obtained.

The tubular element 10 advantageously consists of thermoplastics so that the same may be simply manufactured by extrusion.

A heat absorbing fluid conveyed through channels 11, in the form of water, for instance, comprising an agent lowering the freezing point, such as glycol, may absorb ambient heat and subsequently deliver such heat at another location. Such a conveyed heat absorbing fluid is in addition easily capable of absorbing solar radiation heat, thus allowing an optimum energy recuperation.

In order to achieve an appropriate transport of the heat absorbing fluid through the channels 11, the ends of the tubular element or tube 10, i.e. the front sides 23 of said channels, are closed. For the supply of heat absorbing fluid a fluid supply 19 opens into a fluid supply chamber 17 formed by an outer pipe part 14 which sealingly engages the outer wall of the tubular element 10 by means of sealing rings 16 at either side of the fluid supply chamber 17.

The outer wall 13 is removed in the area of the fluid supply chamber 19, so as to have the channels 11 open into said fluid supply chamber 17.

On the other hand a fluid outlet chamber 18 is formed at the other end of the tubular element 10, by means of another outer pipe part 15 which also sealingly engages the outer wall 13 of the tubular element 10, through sealing rings 16.

In this area a part of the outer wall 13 has also been removed in order to have the channels 11 freely open into said outlet chamber 18.

In FIG. 1 the tubular element 10 comprises a circular fluid inlet channel 17 and a circular fluid outlet channel 18, but it will be obvious that various embodiments can be used within the scope of the present invention.

So, for example, referring now to FIG. 4, the internal pipe parts 14a and 15a can be installed inside the tube 10a and sealingly engage the inner wall 12 of said tubular element. Obviously the channels 11 will in this case open into the liquid supply chamber 17a and the liquid outlet chamber 18a by removing a part of the inner wall 12 of the tubular element 10.

It will also be obvious that a combination can be used of the embodiments of FIGS. 1 and 4.

Referring now to FIGS. 5 and 6 in an additional modified embodiment heat absorbing liquid flows through e.g., half of the channels 11 starting from liquid supply chamber 17, toward the other end of the tube 10 and subsequently through the other half of channels 11, toward liquid outlet chamber 18 provided with outlet 20.

In the latter embodiment the channels 11 are open at one end and extend into a covering cap 26 which provides an open connection in the form of a chamber 27 for passage of the heat absorbing liquid from the channels 11 being connected with the liquid inlet chamber 17, toward the channels 11 being connected with the liquid outlet chamber 18. In order to obtain such an open connecting chamber 27, the covering cap 26 comprises an upright outer flange 26a and an upright outer flange 26b, which flanges sealingly engage the inner wall 12, outer wall 13 respectively, of the tube or tubular element 10, by means of sealing rings 16a and 16b.

As in this embodiment the liquid outlet chamber 18 and liquid inlet chamber 17 are positioned opposite each other, care should be taken that the fluid inlet flow, fluid outlet flow respectively, remain separated from each other. For this purpose use is made of a ring 14, consisting of two separate ring parts 14a and 14b which comprise chamber partitions in the form of projecting cams 24 and 25 covering part of the channels 11 and thereby ensuring that fluid outlet chamber 18 and fluid inlet chamber 17 are separated from each other.

A suitable tubular heat exchanging element 7 e.g. consists of one integral tube 10 having an outer diameter of 160 mm, an inner diameter of 151 mm, whilst the average diameter of each of the one hundred and thirty longitudinally extending channels amounts to 2.7 mm. Said tube may have a length of e.g. 3 m.

The above values, however, do not imply any restriction with respect to the scope of the present invention, but are solely mentioned to point out that use is made of longitudinally extending channels having a relatively small cross-section and a small wall thickness, thus allowing an optimum heat exchange.

In addition to the above described embodiments a tubular element can also be shaped with channels being open at both front ends, which channels are connected to a liquid inlet chamber and a liquid outlet chamber, whereby it is recommended for facility's sake to close said front ends around the inner side of the tubular element, by means of a closing member.

In relation to other elements, however, the embodiment of the heat absorbing element 7 of FIG. 1 is preferred as this embodiment allows ambient air for which heat is to be absorbed, to flow both along the outer wall 13 and the inner wall 12 of said tubular element, so that an optimum energy recuperation is effected. Additionally the presence of solar radiation allows said solar radiation to act upon the outer wall 13 of the tube 10, while on the other hand ambient air may simultaneously flow along the inner wall 12 of such a tubular element.

The heat exchanging elements of the invention are particularly suitable for use in a heat providing system according to the invention comprising a heat exchanger 5 connected to a second cycle 1, incorporating a compressor 2 for compressing Freon transported through the second cycle 1 and a successive condensor 3 for the condensation of Freon, while providing heat to e.g. water, conveyed from a vessel 28 and a throttle member 4. Said Freon is subsequently evaporated in the heat exchanger 5 by the evaporator comprising a spiral 5a.

In order to effect the evaporation of Freon in the evapory-spiral 5a, the heat exchanger 5 is provided with a first cycle 8 comprising a transport pump 9 and a heat absorbing element 7.

Referring now to FIG. 8 another heat exchanging absorbing element 7' for this system as mentioned hereinbefore, is constructed as a flat plastic heat absorbing element 7'. Said element comprises channels 11' bounded by a partition outer wall 13' and a partition inner wall 12' which open into a fluid feed channel 17' and a fluid outlet channel 18'.

Said heat providing systems, also called heat pumps, are used in houses or for the production of hot water, but up till now the required heat for heating said water is derived from the ambient air by means of a radiator along which air is blown by a blower, said radiator conveying a heat absorbing fluid by means of a transport pump.

This known heat providing system has the drawback that, due to the use of a blower, much energy is lost, so that the specific heat output of the heat providing system, that it to say the moist heat output divided by the mechanical energy to be provided, is relatively low. An expensive metal radiator as used which additionally has to be protected against any unfavorable weather influences, causes, moreover, the investment costs to be extremely high.

The present invention provides a system providing a considerably higher specific heat output at rather low investment costs, particularly by using relatively thin-walled plastic heat absorbing elements.

What is claimed is:

1. A heat exchanging element comprising a plurality of channels, disposed adjacent each other for conveying a heat exchanging fluid, comprising:
   a tubular element comprising an inner wall and an outer wall;
   partitions extending between said inner and outer walls thereby forming longitudinally extending channels, said channels being closed at at least one end;
   a tubular pipe part sealingly engaging one of said walls of said tubular element, said part forming a fluid supply chamber, said fluid supply chamber being fluidly connected to said channels through an opening in said one of said walls, said tubular pipe part being concentrically spaced with respect to said tubular element;
   an outlet chamber disposed adjacent to said tubular element and being fluidly connected to said channels through an opening in one of said walls.

2. The heat exchanging element of claim 1, wherein the channels are closed at at least one end while near their ends at least a part of the channels open into the supply chamber and at least another part of the channels open into an outlet chamber.

3. The heat exchanging element of claim 1, wherein all channels open into the supply chamber and all channels open into the outlet chamber, said supply chamber and outlet chamber each being located near different ends of the tubular element.

4. The heat exchanging element of claim 1, wherein in the area of the supply chamber and outlet chamber the portions of the wall between the channels and supply chamber and outlet chamber have been removed.

5. The heat exchanging element of claim 1, wherein one of the outlet chamber and the supply chamber is formed by an outer pipe part provided with an outlet or inlet, which outer pipe part sealingly engages the outer wall of the tubular element by means of sealing rings.

6. The heat exchanging element of claim 1, wherein one of the outlet chamber and the inlet chamber is formed by an internal pipe part provided with an inlet or outlet, said inner pipe part sealingly engaging the inner wall of the tubular element by using sealing rings.

7. The heat exchanging element of claim 1, wherein one end of the tubular element is provided with an open connection between the channels, and the outlet chamber and the inlet chamber are positioned opposite each other, a part of the channels opening into the supply chamber and another part into the outlet chamber.

8. The heat exchanging element of claim 7, wherein the outlet chamber and inlet chamber are formed by a pipe part sealingly engaging a wall of the tubular element, the outlet chamber and inlet chamber being separated from each other by chamber partitions.

9. The heat exchanging element of claim 1, wherein the tubular element consists of a plastic material while preferably the partitions are integral with the outer wall and inner wall.

* * * * *